United States Patent
Ostertag (10) Patent No.: US 9,321,135 B2
(45) Date of Patent: Apr. 26, 2016

(54) FLUIDOSTATIC ROLLING DEVICE FOR SURFACE PROCESSING AND METHOD FOR SHAPING THE EDGE LAYER

(75) Inventor: Alfred Ostertag, Celle (DE)

(73) Assignee: ECOROLL AG Werkzeugtechnik, Cell (DE)

( * ) Notice: Subject to any disclaimer, the term of this patent is extended or adjusted under 35 U.S.C. 154(b) by 132 days.

(21) Appl. No.: 13/982,572

(22) PCT Filed: Feb. 8, 2012

(86) PCT No.: PCT/DE2012/000143
§ 371 (c)(1),
(2), (4) Date: Jul. 30, 2013

(87) PCT Pub. No.: WO2012/107028
PCT Pub. Date: Aug. 16, 2012

(65) Prior Publication Data
US 2013/0305505 A1    Nov. 21, 2013

(30) Foreign Application Priority Data
Feb. 11, 2011   (DE) .......... 10 2011 011 276

(51) Int. Cl.
*B23P 9/02*   (2006.01)
*B24B 39/00*   (2006.01)
(52) U.S. Cl.
CPC . *B23P 9/02* (2013.01); *B24B 39/00* (2013.01); *B24B 39/003* (2013.01); *Y10T 29/47* (2015.01); *Y10T 29/476* (2015.01); *Y10T 29/479* (2015.01)
(58) Field of Classification Search
CPC ......... B23P 9/02; B24B 39/00; B24B 39/003; B24B 39/01; B24B 39/023; B24B 39/026; Y10T 29/476; Y10T 29/479; Y10T 29/47
See application file for complete search history.

(56) References Cited

U.S. PATENT DOCUMENTS

| | | | |
|---|---|---|---|
| 2,575,938 A | 11/1951 | Brenneke | |
| 3,515,676 A * | 6/1970 | Hierta et al. | ............. 261/78.2 |
| 3,911,707 A | 10/1975 | Minakov et al. | |
| 4,922,739 A * | 5/1990 | Ostertag | ............. 72/80 |
| 5,339,523 A | 8/1994 | Hasegawa | |

(Continued)

FOREIGN PATENT DOCUMENTS

| | | |
|---|---|---|
| CN | 2268836 Y | 11/1997 |
| CN | 1175919 | 3/1998 |
| CN | 1263796 | 8/2000 |

(Continued)

*Primary Examiner* — John C Hong
(74) *Attorney, Agent, or Firm* — Whitham, Curtis, Christofferson & Cook, P.C.

(57) ABSTRACT

A fluidostatic tool with at least one rolling element uses a pressurized lubricant mist or aerosol to apply force against a metal workpiece surface that is flat, curved or cylindrical. The rolling element, such as a ball, is held within a tubular borehole of the tool and cushioned on the pressurized lubricant mist during machining of the metal surface. Viscosity of the lubricant mist increases and reduces friction between the ball and the metal surface as it exits the tool, thereby reducing or eliminating the need for other lubricants during the machining process. The pressure of the lubricant mist against the ball seals the borehole of the tool and prevents leakage of the pressurized lubricant mist when the tool is not engaged with a metal workpiece surface. The lubricant mist can be an oil-free lubricant or a mixture of oil-free lubricant and oil components.

12 Claims, 5 Drawing Sheets

(56) References Cited

U.S. PATENT DOCUMENTS

| | | |
|---|---|---|
| 2002/0029600 A1 | 3/2002 | Heimann et al. |
| 2004/0112649 A1* | 6/2004 | Muuttonen .................. 175/414 |

FOREIGN PATENT DOCUMENTS

| | | |
|---|---|---|
| CN | 2498442 Y | 7/2002 |
| CN | 2664810 | 12/2004 |
| CN | 1721136 | 1/2006 |
| CN | 1812866 | 8/2006 |
| CN | 101109409 A | 1/2008 |
| CN | 101362300 A | 2/2009 |
| CN | 201625660 U | 11/2010 |
| DE | 10133314 A1 | 1/2003 |
| DE | 10157677 A1 | 6/2003 |
| DE | 10340267 A1 | 3/2005 |
| EP | 0 353 376 A1 | 2/1990 |
| EP | 0353427 | 2/1990 |
| EP | 1275472 | 1/2003 |
| JP | 02-041870 A | 2/1990 |
| JP | 6143128 | 5/1994 |
| JP | 9-300206 | 11/1997 |
| JP | 10-217012 | 8/1998 |
| JP | 10-311326 | 11/1998 |
| JP | 11-77526 | 3/1999 |
| JP | 2002526271 A | 8/2002 |
| JP | 2004531401 A | 10/2004 |
| JP | 2005-74580 | 3/2005 |
| JP | 2005-177915 | 7/2005 |
| JP | 2007152536 A | 6/2007 |
| JP | 4575899 | 11/2010 |
| WO | 9001395 | 2/1990 |

\* cited by examiner

FLUIDOSTATIC ROLLING DEVICE FOR SURFACE PROCESSING AND METHOD FOR SHAPING THE EDGE LAYER

The invention relates to a fluidostatic rolling device for surface treatment, in particular for roller burnishing and/or deep rolling, with (a) at least one rolling element, (b) at least one fluidostatic mounting by means of which the rolling element is mounted, and (c) at least one pressurised fluid supply which is designed to feed a pressurised fluid to the mounting, wherein (d) the mounting is designed such that the rolling element can be pressed against a workpiece surface to be processed by means of the pressurised fluid.

According to a second aspect, the invention relates to a method for treating the subsurface with the steps (i) subjection of a rolling element of a rolling tool to a pressurised fluid, (ii) establishment of contact between the rolling element and a workpiece surface, so that the rolling element exerts a force on the surface, and (iii) movement of the rolling element relative to the workpiece.

Hydrostatic rolling devices are used for treating the subsurface of workpieces, in particular metal workpieces. They comprise a rolling tool equipped with one or several rolling elements that are pressed with significant force against the workpiece surface, while the tool and the workpiece move relative to one another, e.g. by rotation. The rolling force is created by a pressurised fluid behind the rolling element.

In order to ensure that the rolling element is not destroyed by abrasive wear within a short time, a lubricant must be applied. For the most part an oil is used as a pressurised fluid, which has a double function; namely raising the hydrostatic pressure on the rolling element on the one hand, and on the other hand lubricating the rolling element relative to its mounting.

The disadvantage of known rolling devices is that only a limited processing speed can be achieved on free formed surfaces or on non-cylindrical workpieces by means of hysteresis of the rolling element movement. It is only in exceptional cases that the processing occurs along a feed axis of the machine tool in use. Therefore, the rolling tool must be tracked along the contour to be processed during the movement of the rolling tool of the rolling device. The tracking is realised in discrete steps, so that the protrusion of the rolling element over its mounting alters with each step and additionally with every change in distance to the workpiece. The quicker the protrusion changes, the more the pressurised fluid, such as the hydraulic oil, attenuates the movement of the rolling device. This restricts the maximum achievable processing speed.

The invention aims to enable higher processing speeds.

The invention solves the problem by means of a hydrostatic rolling device according to the preamble, wherein the pressurised fluid is a gas. In addition, the invention solves the problem by means of a machine tool with a rolling device of this sort.

According to a second aspect, the invention solves the problem by means of a method according to the preamble, wherein a pressurised gas is used as a pressurised fluid.

The invention is based on the recognition that the rolling element can be mounted hydrostatically by a gas. This is surprising because the viscosity of gases increases with the temperature, whereas the viscosity of fluids decreases. As a rule, the viscosity of gases increases as the temperature grows: in contrast, this remains almost unchanged in fluids. Should a pressurised gas expand, its viscosity decreases very quickly. However, since a high viscosity is a prerequisite for a secure hydrostatic mounting, it could be expected that gas is not suitable.

It is an advantage of the invention that the low viscosity of gases permits considerably higher processing speeds.

In addition it is advantageous that the expense of the procurement and disposal of cooling lubricant can be excluded.

A further advantage is that the changes induced by rolling in the properties of the subsurface of some materials, such as certain steels, are maintained for longer. The background for this is that the temperature and the pressure of the gas, which contains lubricant particles, can be selected in such a way that the gas containing lubricant particles close to the rolling element cools down during expansion. This then causes cold-forming in the subsurface of the workpiece, which improves the surface of the material for a particularly long time.

Within the scope of the above description the term rolling element should be particularly understood to mean an element that is part of a rolling tool, like the mounting, which, for its part, is part of the rolling device and can be subjected to pressurised fluid from the pressurised fluid supply. In particular, the rolling element is designed and arranged such that it rotates during movement of the rolling tool along the workpiece surface and thus acts upon the subsurface of the workpiece. A rolling element refers especially to a ball.

The term fluidostatic mounting should be particularly understood to mean a device by means of which the position of the rolling element is maintained relative to the rest of the rolling tool. The characteristic that a fluidostatic lead is referred to should be understood to mean that the rolling element is held on a cushion of gas from the pressurised gas during operation, so that no friction occurs between the solid objects of the rolling element and the mounting, or between similar components of the rolling tool.

The gas refers to, for example, air, nitrogen, carbon dioxide or a mix of these. However, in principle all gases can be used. It is advantageous if the inversion temperature of the gas is above 0° C. The term gas should be particularly understood to mean a material that is in the form of a gas at a room temperature of 22° C. and a normal pressure of 1013 hPa. In particular, the term gas should be understood to mean a material that is also in the form of a gas at room temperature at 200 bars (20 MPa).

It is possible that the rolling device comprises several rolling tools. Independent of this, it is possible that the rolling tool or tools each have one, two, three or more rolling elements.

If the rolling tool has several rolling elements, these can be arranged along a straight line or a curve, in particular a circle. It is also possible for the rolling elements to be arranged along a curved surface, in particular the surface of a cylinder or a barrel-like surface.

The pressurised fluid is preferably a pressurised gas which contains lubricant particles. It is then an advantage that the use of cooling lubricant can be significantly reduced.

It is advantageous that the concentration of lubricant particles in the gas can be selected to be so low that only a thin film of lubricant particles, such as oil, remain on the workpiece which no longer need be removed. Due to the fact that with known fluidostatic rolling devices the pressurised fluid simultaneously acts as a lubricant, thus meaning that a considerably higher lubricant performance is necessary compared to the invention, it is surprising that a low amount of lubricant particles are sufficient.

According to a preferred embodiment, the gas containing lubricant particles is a lubricant mist. It is also conceivable that the gas containing lubricant particles is a fume, i.e. it contains solid particles. However it is particularly favourable if the gas containing lubricant particles is an aerosol made up of gas and droplets of lubricant. Preferably, over 90% of the droplets of lubricant in the lubricant mist have a maximum droplet size of 10 micrometers, in particular a maximum of 1 micrometer.

According to a preferred embodiment, the pressurised fluid supply is constructed to emit a pressurised fluid, which emits a maximum of 50 milliliters of lubricant per operation hour. This then concerns a rolling tool with a minimum amount of lubrication.

According to a preferred embodiment, the pressurised fluid supply is designed to emit a lubricant mist that contains droplets of an oil-free lubricant. It is of course also possible that the lubricant mist contains drops of lubricant which contains an oil, i.e. an oil aerosol, or which contains both oil-free and oil components.

The mounting is preferably designed such that the at least one rolling element can be pressed against a workpiece surface to be processed with a temporally constant force. This is especially advantageous during roller burnishing. There are known surface treatment tools whose impact balls are held on a circuit by pressurised air, wherein the impact balls strike contact balls at regular distances, the contact balls being located on the workpiece surface. This causes a solidification of the subsurface of the workpiece, which is unwanted, especially during roller burnishing. The characteristic that the force is temporally constant should be particularly understood to mean that the force that the rolling element exerts on the workpiece surface essentially does not fluctuate, i.e. especially less than 20%, when the tool meshes with the workpiece, but the tool is not moved.

It is of course also possible to apply a temporally variable force with this sort of rolling device, for example in the form of a temporally gradually increasing or decreasing force. However, it is advantageous that a constant force can also be applied.

The mounting is preferably designed as such that the at least one rolling element applies a force on the workpiece during processing which fluctuates with a maximum basic frequency of 1 Hertz.

The pressurised fluid supply is preferably designed to emit a pressurised fluid that is under an operating pressure, the operating pressure having a value of at least 20 bars (2 MPa), in particular at least 50 bars (5 MPa). It has been seen that the lubrication of the rolling element is securely ensured with an operating pressure of at least 20 bars. According to the current state of knowledge, this can be ascribed to the fact that the pressurised gas expands in the vicinity of the rolling element, cooling down in the process; as a result, the viscosity of the droplets of lubricant increases. The lubricant sticks to the rolling element more effectively, thus ensuring a secure lubrication of the rolling element, despite the low concentration of lubricant in the pressurised fluid.

In addition, the lubricant particles, in particular the droplets of lubricant, cool down when they are situated between the mounting and the rolling element. The flow velocity is highest at this point and according to Bernoulli's principle, the pressure is especially low and thereby also the temperature. As the droplets of lubricant have a high viscosity in the gap between the mounting and the rolling element, they prevent gases from flowing through, thus reducing the use of pressurised fluid or lubricant mist.

As a result of the high operating pressure, an adhesive lubricant is also blown off of the workpiece surface, so that, as a rule, the workpiece no longer has to be cleaned following processing.

The mounting preferably has a rolling element seat by means of which the rolling element is held. This means that the rolling element cannot be pushed out of the rolling tool by the pressurised fluid, as it is held by the rolling element seat. However, it is also conceivable that, for example, the mounting does not prevent the rolling element from moving radially outwards during the processing of boreholes. In this case, the rolling tool preferably comprises a casing which hinders the rolling element from escaping, if this is not prevented by an opposing workpiece surface.

The fluidostatic mounting preferably has a rolling element seat, wherein the rolling element seat is designed such that it can be at least fundamentally sealed from fluids by means of rolling element, so that essentially no pressurised fluid leaks if the rolling element is no longer meshing with the workpiece. To this point it is advantageous that only very little pressurised fluid is used when the rolling tool is not in contact with a workpiece. In particular the leakage current has a maximum value that is one tenth of the maximum possible pressurised fluid current.

The rolling element seat is preferably designed such that a cushion of pressurised fluid forms between the rolling element seat and the rolling element when the rolling element is pressed against a workpiece.

It is favourable if the rolling tool comprises a temperature control system and/or an arrangement for controlling and/or regulating the gas temperature of the gas containing lubricant particles. As is mentioned above, in preferred methods according to the invention the cooling of the gas caused by expansion plays a role. When the pressure remains the same, the temperature of the rolling element can be set by setting the temperature of the gas, so the conditions under which rolling occurs can be defined. Of course, the gas temperature of the gas containing lubricant particles can be set before or also after the introduction of the lubricant particles, in particular the liquid lubricant particles.

The pressurised fluid supply preferably comprises a compressor for compressing air. In this case it is beneficial if a temperature control unit is provided behind the compressor on the flow-off side, which in particular can comprise a heat exchanger. By means of the heat exchanger, the heat resulting from compression can be discharged.

In particular, a method according to the invention is carried out such that the rolling element is subjected to pressurised fluid in such a way that it flows around the rolling element, lubricant particles, in particular droplets of liquid lubricant, lubricate the rolling element and an expansion of the pressurised fluid upon leaving the rolling tool leads to a drop in the temperature of the pressurised fluid by more than 10 Kelvin, in particular by more than 20 Kelvin. As explained above, the viscosity of the droplets of liquid lubricant increases as a result. The higher the operating pressure of the pressurised fluid, the greater the decrease in temperature, as a rule. For example, it can be advantageous if the operating pressure has a value of at least 150 bars, as a fall in temperature of more than 30 Kelvins can then occur.

In particular, the gas temperatures and/or the fluid pressure of the gas containing lubricant particles are selected in such a way that the temperature of the pressurised fluid lies below 20° C., preferably below 10° C., and in particular below 5° C. once it has left the rolling element, i.e. close to the workpiece surface.

It is therefore beneficial if the method involves setting the gas temperature of the gas containing lubricant particles to a gas temperature that is lower than 50° C., in particular lower than 40° C.

According to a preferred embodiment, the pressurised fluid comprises a lubricant mist that contains droplets of lubricant made of a liquid lubricant, wherein the viscosity of the liquid lubricant is dependent on temperature. Preferably, the rolling element is subjected to a lubricant mist with such an operating pressure that the viscosity of the lubricant increases by at least twice the value, due to the decrease in temperature during the expansion of the lubricant mist in the vicinity of the rolling element.

The method is suitable for the processing of free formed surfaces, of at least partially rotationally symmetrical parts, of holes, in particular cylindrical and non-cylindrical boreholes, as well as in combination with other tools, in particular cutting tools. According to the invention, it is therefore also a combined peeling-rolling tool, for example, which comprises a cutting tool alongside the above mentioned properties for a fluidostatic rolling device, in particular at least one geometrically defined cutting edge.

The method is preferably carried out in such a way that the pressurised fluid has a temperature of less than 15° C., in particular less than 10° C., upon leaving the rolling tool. In this way, workpieces made of materials that have a tendency towards work hardening during rolling can be solidified especially strongly.

With the aid of the attached drawings the invention will be explained in more detail. What is shown is FIG. 1 A cross section through a rolling tool of a rolling device according to the invention at the height of the rolling element, FIG. 2 A perspective view of a rolling device according to the invention, FIG. 3 A second embodiment of a rolling device, FIG. 4 A third embodiment of a rolling device, FIG. 5 A fourth embodiment of a rolling device according to the invention, FIG. 6 A detail drawing of the thermodynamic ratios on the rolling element and FIG. 7 A cross section through a rolling device according to the invention.

Figure 1:
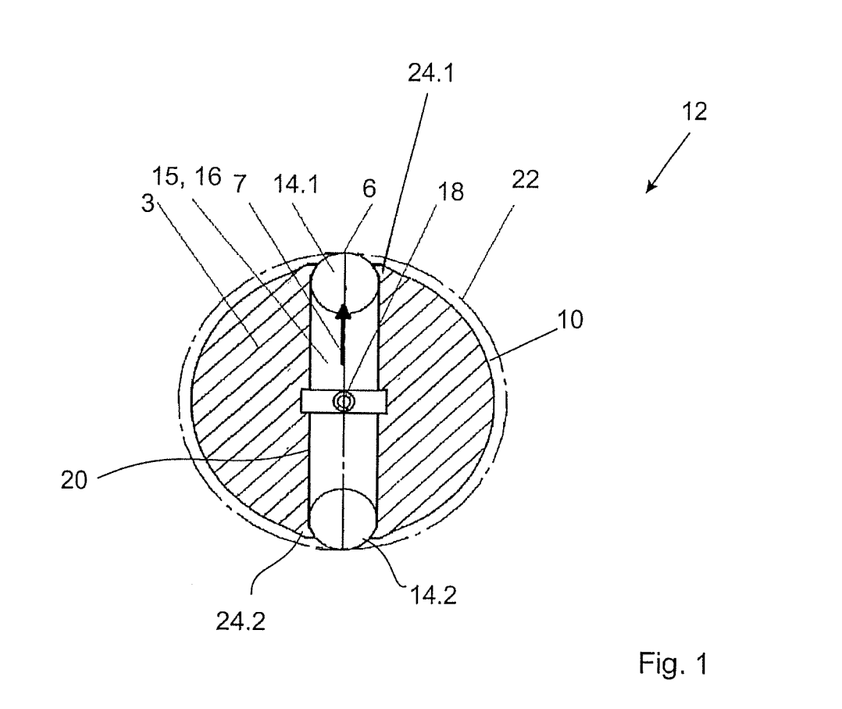

FIG. 1 shows a cross section through a head 10 of a rolling tool according to the invention 12. The rolling tool 12 has a rolling element 14.1 and a second rolling element 14.2 which are mounted by means of a mounting 15, here in the form of a borehole 16. The rolling elements 14 (references with no numerical suffix refer to the object as such) have a diameter that is slightly smaller than the diameter of the borehole 16, so that they are housed in the borehole 16 such that they can be moved and rotated.

A pressurised gas 20 is supplied by means of a channel 18, so that the rolling elements 14 are pushed radially outwards against a workpiece surface 22 to be processed. The rolling elements 14 then exert a force on the workpiece surface 22 and distort it. Optionally, the mounting can have restraint structures 24.1, 24.2, as provided in the present embodiment, which prevent the rolling elements 14 from being able to leave the rolling tool 12. In addition, the restraint structures largely prevent an escape of gas 20 if the rolling element 14 is not in contact with a workpiece. As soon as the rolling element 14 is deflected by a workpiece surface, a gap opens up and an air cushion forms, which guides the rolling element 14.

Figure 2:
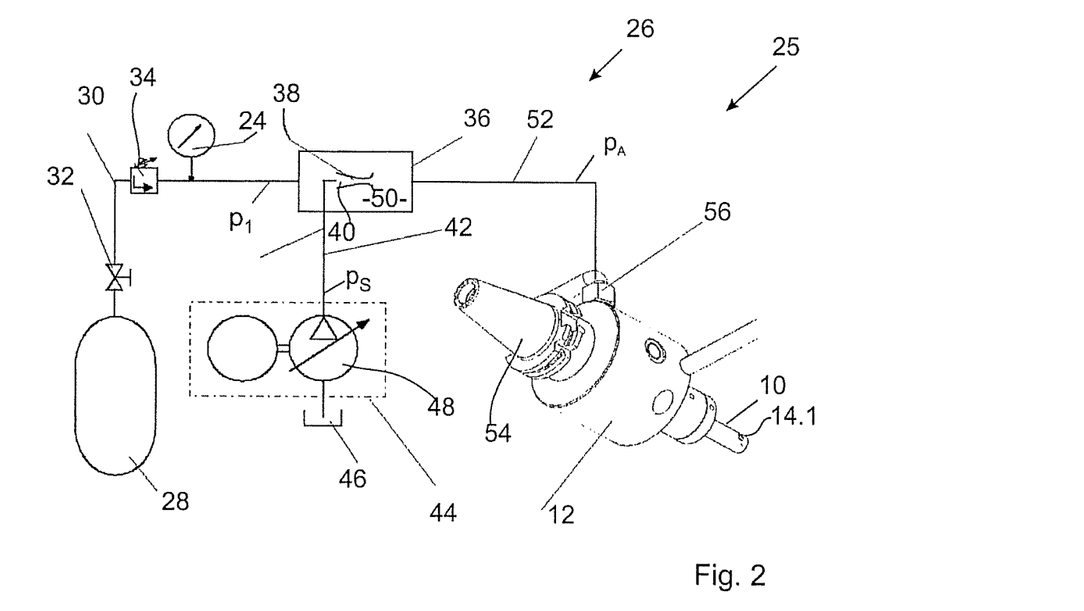

FIG. 2 shows a schematic view of a rolling device 25 according to the invention with the rolling tool 12 and a pressurised fluid supply 26. The pressurised fluid supply 26 comprises a pressurised gas source 28 from which gas 20 can be extracted via a pressure line 30. The gas flow can be interrupted using a valve 32, so that the pressurised gas source 28 can be changed, for example. A pressure regulator 34 sets a fluid pressure $p_1$ with which the pressurised fluid gas 20 is led into a mist chamber 36.

A nozzle 38 is arranged in the mist chamber 36 that turns liquid lubricant 40 into mist, which is supplied with a liquid lubricant pressure $p_s$ from a liquid lubricant line 42. The liquid lubricant line 42 is fed by a lubricant dosage unit 44 that comprises a lubricant tank 46 for liquid lubricant and a lubricant pump 48. The liquid lubricant pressure $p_s$ is mostly higher than the fluid pressure p□. A lubricant mist 50 forms in the mist chamber 36, which is led to the rolling tool 12, upon which the head 10 is arranged, via a pressure line 52 with an operating pressure $p_4$.

The components from the pressurised gas source 28, including the pressure line 52 and a pressure terminal 56 are part of the pressurised fluid supply 26. The tool 12 comprises a tool shaft 54 via which a rotary movement of a spindle can be induced. The housing is prevented from rotating with it by means of an anti-rotation lock, so only the head 10 rotates.

A method according to the invention is carried out such that the rolling elements 14 of the rolling tool 12 are initially subjected to gas, in particular gas containing lubricant particles, from the pressurised fluid supply 26. Either prior to or following this, the rolling elements 14 are brought into contact with a workpiece surface, not shown in FIG. 2, so that the rolling elements 14 exert a force on the workpiece surface. The rolling tool 12 is then moved relative to the workpiece, in the present case with a rotating head along a borehole, so that the rolling element or rolling elements influence the subsurface of the workpiece.

For the supply of a gas containing lubricant particles for the rolling tool 12, gas 20 is extracted from the pressurised gas bottle 28, brought to a pre-set pressure $p_1$ by means of the pressure regulator 36 and led to the mist chamber 36, where the liquid lubricant 40 is turned into mist by means of a Venturi nozzle, for example. The resulting gas containing lubricant particles, which is under an operating pressure $p_4$, is then led to the rolling tool 12.

The lubricant pump 48 is driven by a control system, not depicted, such that the amount of lubricant particles in the gas containing lubricant particles emitted by the pressure line 52 remains constant.

Figure 3:
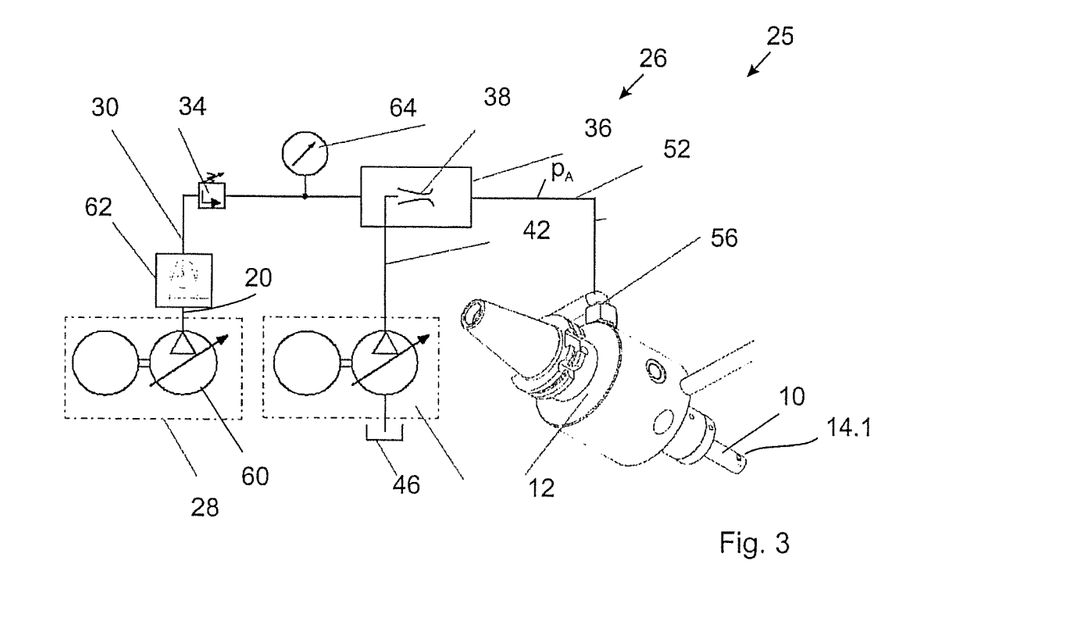

FIG. 3 shows an alternative embodiment of a pressurised fluid supply 26 of a rolling device 25 according to the invention whose pressurised gas source 28 comprises a compressor 60 that sucks in surrounding air and compresses it. The resulting pressurised gas 20 reaches a temperature control system 62 with a heat exchanger and controls or regulates the pressurised gas 20 at a pre-set gas temperature $T_G$. It is possible for a manometer 64 to be arranged behind the pressure regulator 34 on the flow-off side, in order to monitor the pressure. However, the pressure regulator 34 and the manometer are not necessary if, for example, the compressor 60 is designed accordingly.

Figure 4:
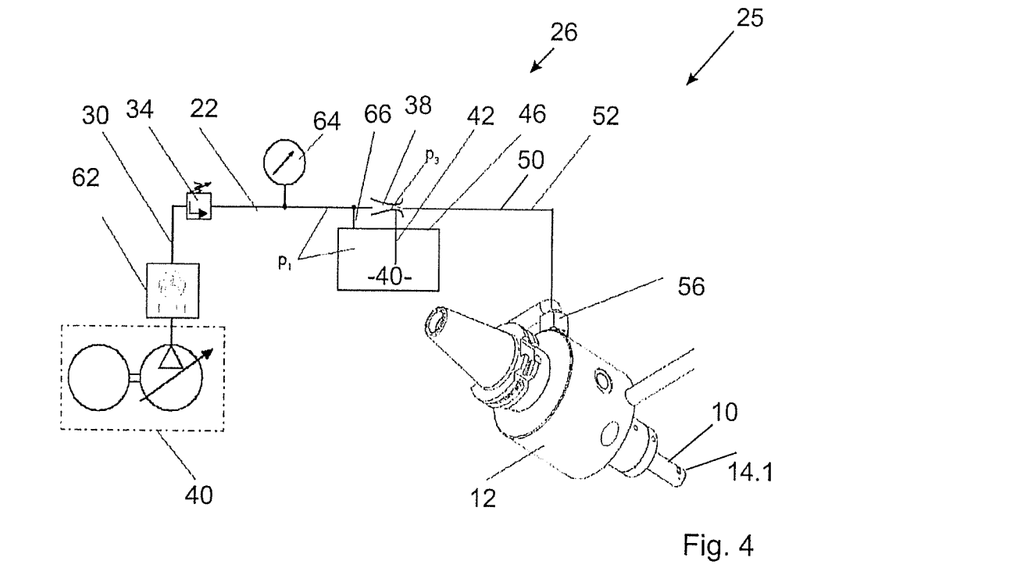

FIG. 4 shows a further embodiment of a pressurised fluid supply 26 whose lubricant tank 46 is under the fluid pressure $p_1$, with a stub conduit 66 ensuring the appropriate pressure balance. The nozzle 38 is designed to be a Venturi nozzle and the liquid lubricant line 42 flows into a point of high flow velocity and thus low pressure in the nozzle 38. As a result, the liquid lubricant 40 is sucked out of the liquid lubricant tank 42 and turned into mist, thereby creating the lubricant mist 50 which is led to the rolling tool 12 by the pressure line 52.

Figure 5:
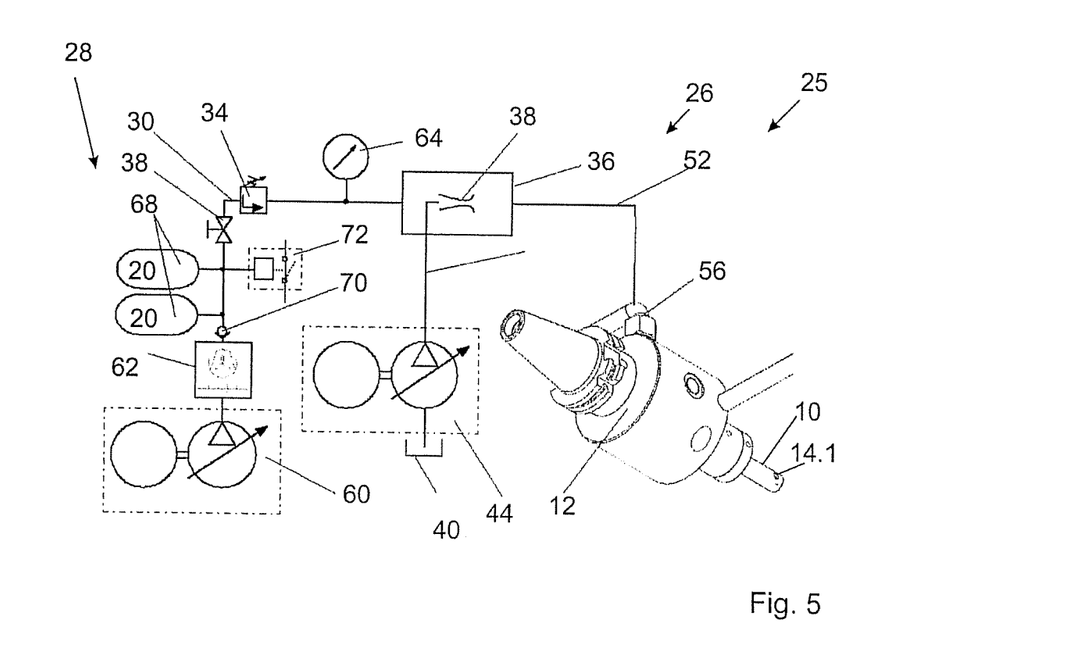

FIG. 5 shows a further embodiment of the pressurised fluid supply 26 for a rolling device 25 according to the invention whose pressurised gas source 28 comprises pressurised gas bottles 68, which are filled by the compressor 60 when necessary. A check valve 70 ensures that pressurised gas 20 does not leave the pressurised gas bottles 68 in the direction of the compressor 60. The compressor 60 is activated by a pressure switch 72 if the pressure in the pressurised gas bottles 68 falls below a pre-set threshold.

Figure 6:
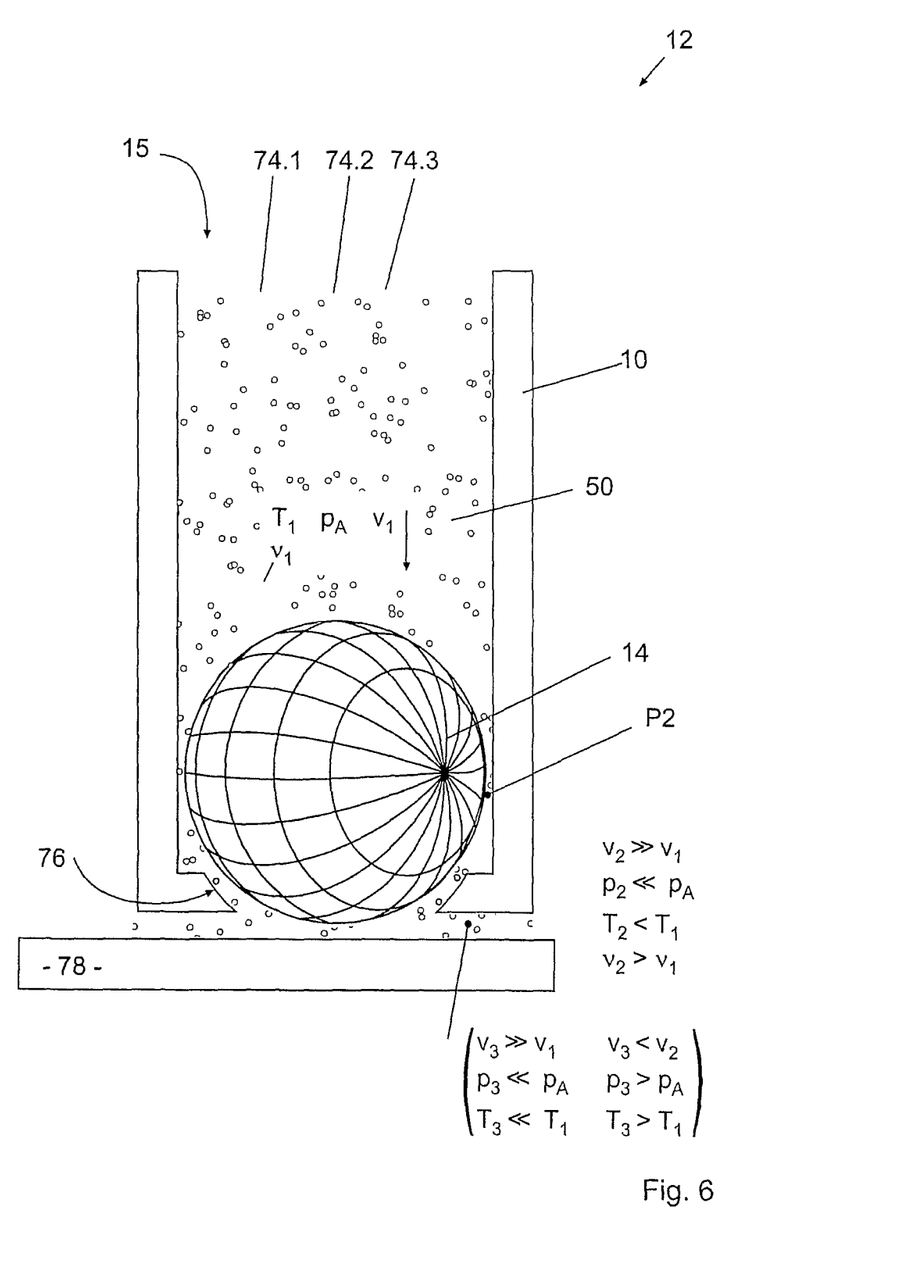

FIG. 6 schematically shows the situation in tool 12 during operation. The gas containing lubricant particles in the form of the lubricant mist 50 flows to the rolling element 14 with a flow velocity v1, the operating pressure pA and the temperature $T_1$. The droplets of lubricant 74.1, 74.2, 74.3, . . . are made of lubricant with a viscosity $v_1$.

At a point P2, for example at the point of the smallest distance between the rolling element 14 and the mounting 15, the flow velocity increases to the value $v_2$, the pressure falls to the value $p_2$ and as a result, the temperature falls to the value $T_2$. The viscosity of v of the droplets of lubricant increases due to the low temperature to the value $v_2$. As a result of the reduced viscosity, some of the droplets of lubricant stick to the rolling element 14 and lubricate it, for example, if the rolling element 14 disengages or reengages with the work piece 78.

Figure 7:
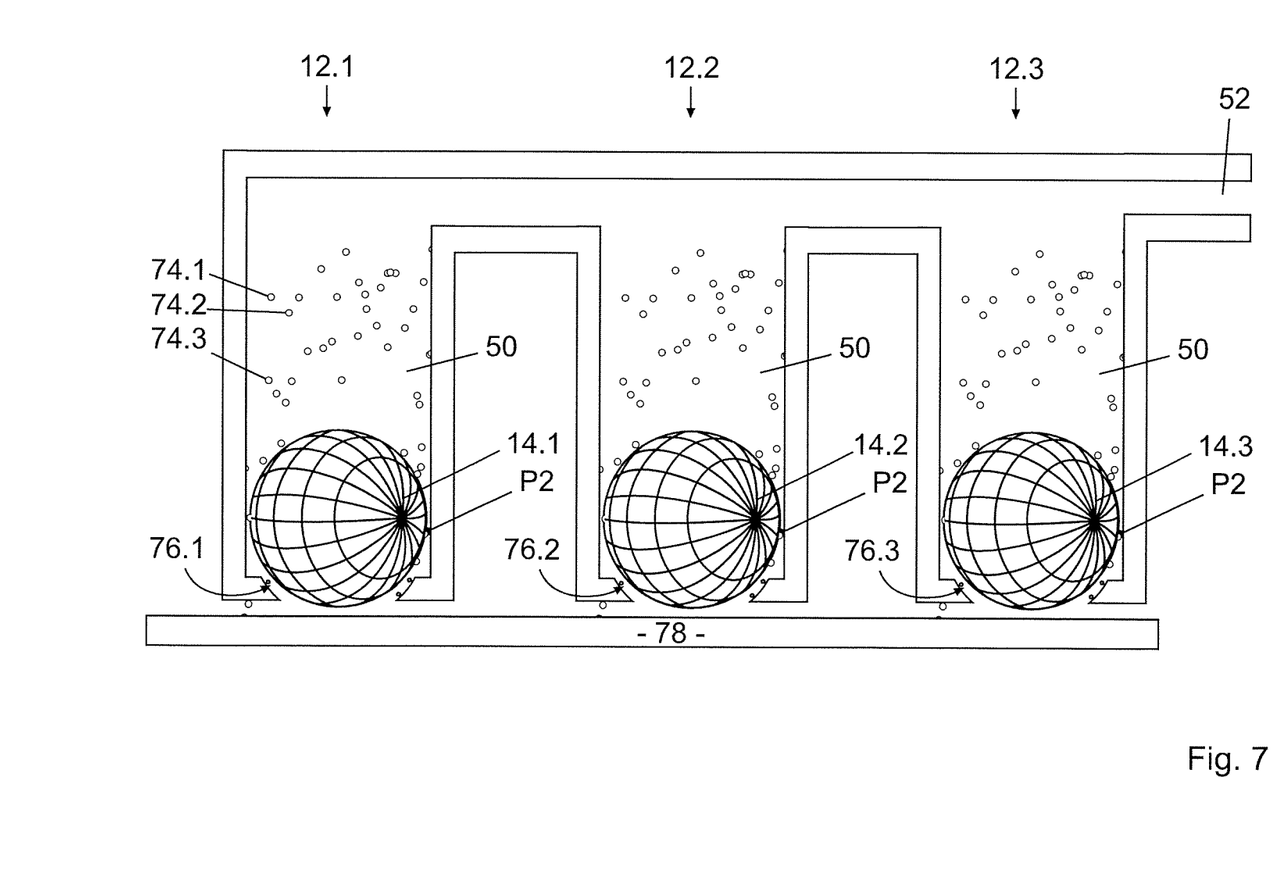

FIG. 7 shows a rolling device 25 according to the invention that has several rolling tools 12, of which the rolling tools 12.1, 12.2, 12.3 can be seen in FIG. 7. Should the rolling tools 12 have no contact with the workpiece 78, the centre point of the balls of the rolling elements 14 are in one area, which can be one plane. However, it is also possible that the plane is curved in one dimension or in two dimensions. The rolling tools 12 are connected to the pressurised fluid supply (see FIGS. 2 to 5) by the same pressure line 52.

The invention claimed is:

1. A fluidostatic rolling device for surface treatment, with
   (a) at least one rolling element,
   (b) at least one fluidostatic mounting, by means of which the rolling element is mounted, comprising a borehole having a diameter slightly larger than a diameter of said at least one rolling element, and a restraining element at a distal opening of said borehole, wherein a diameter of said distal opening is slightly smaller than said diameter of said rolling element, and
   (c) at least one pressurised fluid supply, which is designed to feed a pressurised fluid to the mounting,
   wherein the mounting is designed such that the at least one rolling element can be pressed against a workpiece surface to be processed with a temporally constant force by means of said pressurised fluid, wherein said pressurised fluid is a lubricant mist.

2. The fluidostatic rolling device according to claim 1, wherein the mounting comprises a fluidostatic mounting in which said at least one rolling element is held on a cushion of pressurised gas, wherein said cushion of gas allows for a stable position of said rolling element during operation, and said rolling element exerts a temporally constant force on the surface of the workpiece, and wherein said rolling element seals said fluidostatic mounting when said fluidostatic rolling device is disengaged from a workpiece surface.

3. A method for treating a subsurface of a workpiece, comprising the steps of:
   subjecting at least one rolling element of a rolling tool to a pressurised fluid,
   establishing contact between said at least one rolling element and a workpiece surface, so that said at least one rolling element is deflected and an air cushion forms and exerts a constant force on the workpiece surface, and,
   moving the rolling tool relative to the workpiece, and wherein said pressurised fluid is a lubricant mist, and disengaging the rolling tool when desired, wherein said pressurised fluid presses said at least one rolling element against a seat, thereby sealing said rolling tool.

4. The method according to claim 3, wherein the pressurised fluid is supplied under an operating pressure of more than 50 bars (5 MPa.

5. The method according to claim 3,
   wherein said lubricant mist has a temperature dependent viscosity, and
   wherein said at least one rolling element is subjected to a lubricant mist with an operating pressure such that the viscosity of the lubricant mist increases due to a decrease in temperature during expansion of the lubricant mist as it leaves the rolling tool.

6. The method according to claim 3, wherein
   said at least one rolling element is subjected to pressurised fluid in such a way that it flows around said at least one rolling element, and said
   lubricant mist lubricates said at least one the rolling element, and
   an expansion of the pressurised fluid upon leaving the rolling tool leads to a drop in temperature of the pressurised fluid by more than 10 Kelvins.

7. The method according to claim 3, wherein the pressurised fluid has a temperature of less than 15° Celsius upon leaving the rolling tool.

8. The method according to claim 7, wherein the pressurised fluid has a temperature of less than 10° Celcius upon leaving the rolling tool.

9. The method according to claim 3, wherein at least the surface of the workpiece is made of a material which can be deformed under work hardening at the temperature with which the pressurised fluid leaves the rolling tool.

10. The method according to claim 3, wherein a drop in temperature of the pressurised fluid is by more than 20 Kelvins.

11. A fluidostatic rolling device for surface treatment, with
    (a) at least one rolling element,
    (b) at least one fluidostatic mounting, by means of which the rolling element is mounted, comprising a borehole having a diameter slightly larger than a diameter of said at least one rolling element, and a restraining element at a distal opening of said borehole, wherein a diameter of said distal opening is slightly smaller than said diameter of said rolling element, and
    (c) at least one pressurised fluid supply, which is designed to feed a pressurised fluid to the mounting,
    wherein the mounting is designed such that the rolling element can be pressed against a workpiece surface to be processed by means of the pressurised fluid, and
    wherein the pressurised fluid is a lubricant mist comprising an oil-free lubricant or a mixture of oil-free lubricant and oil components.

12. A fluidostatic rolling device for surface treatment, with
    (a) at least one rolling element,
    (b) at least one fluidostatic mounting, by means of which the rolling element is mounted, comprising a borehole having a diameter slightly larger than a diameter of said at least one rolling element, and a restraining element at a distal opening of said borehole, wherein a diameter of said distal opening is slightly smaller than said diameter of said rolling element, and
    (c) at least one pressurised fluid supply, which is designed to feed a pressurised fluid to the mounting, wherein said pressurised fluid is a lubricant mist, and
    wherein the mounting is designed such that the rolling element can be pressed against a workpiece surface to be processed by means of the pressurised fluid, and said rolling element is able to seal said mounting when said rolling element is not pressed against a workpiece surface.

* * * * *